United States Patent [19]
Shirley, Jr. et al.

[11] Patent Number: 5,514,307
[45] Date of Patent: May 7, 1996

[54] PROCESS FOR THE REDUCING EMISSIONS DURING PRILLING OF MATERIAL SUCH AS AMMONIUM NITRATE

[75] Inventors: Arthur R. Shirley, Jr.; Phillip A. Forsythe, both of Florence; William M. Giles, Cherokee; John A. Phillips, Sheffield, all of Ala.

[73] Assignee: Laroche Industries, Inc., Atlanta, Ga.

[21] Appl. No.: 280,245

[22] Filed: Jul. 25, 1994

Related U.S. Application Data

[63] Continuation of Ser. No. 960,100, Oct. 13, 1992, abandoned.
[51] Int. Cl.⁶ .......................................................... B01J 2/04
[52] U.S. Cl. .............................................. 264/14; 264/13
[58] Field of Search .................................. 264/13, 19, 11

[56] References Cited

U.S. PATENT DOCUMENTS

| | | | |
|---|---|---|---|
| 2,934,412 | 4/1960 | Stengel | 264/13 |
| 3,231,640 | 1/1966 | Klopf | 264/13 |
| 3,446,877 | 5/1969 | Endler | 264/13 |
| 3,538,200 | 11/1970 | Hite | 264/13 |
| 3,936,499 | 2/1976 | Zardi et al. | 264/5 |
| 4,031,174 | 6/1977 | Bennett | 264/14 |
| 4,076,773 | 2/1978 | Mahl, Jr. et al. | 264/14 |
| 4,190,622 | 2/1980 | Landis | 264/14 |
| 4,263,012 | 4/1981 | Leszczynska et al. | 264/14 |
| 4,339,401 | 7/1982 | Clark et al. | 264/11 |
| 4,390,483 | 6/1983 | Willems et al. | 264/7 |
| 4,424,176 | 1/1984 | Shirley, Jr. et al. | 264/7 |
| 4,449,900 | 5/1984 | Lerner | 425/6 |
| 4,559,187 | 12/1985 | Haour et al. | 264/11 |
| 4,892,932 | 1/1990 | Rauch et al. | 264/11 |

FOREIGN PATENT DOCUMENTS

| | | | |
|---|---|---|---|
| 852650 | 9/1970 | Canada | 264/13 |
| 2540743 | 8/1984 | France | 264/14 |
| 1389821 | 4/1975 | United Kingdom | 264/14 |
| 1459781 | 12/1976 | United Kingdom | 264/14 |
| 8805373 | 7/1988 | WIPO | 264/14 |

*Primary Examiner*—Allan R. Kuhns
*Attorney, Agent, or Firm*—Cushman Darby & Cushman

[57] ABSTRACT

This invention relates to an improvement in prilling whereby water is atomized into a prill tower to affect faster solidification of the prill, and in particular, the outside surface of the prill by providing an increased rate of surface cooling while reducing the required air flows in the tower. This results in a major reduction in air pollution potential in the form of both fume and particulate while at the same time allowing substantial production rate increases. Specifically, the invention relates to quick freezing the outside surface of the prill by flash evaporation of finely atomized water particles on the surface of the prill or in extremely close proximity to the prill to greatly lower the vapor pressure at the prill's surface and by continued flash evaporation to enhance cooling so as to allow upward flowing air to be reduced to a point where micro-prills which are formed in prilling can settle in the prill tower while obtaining the same or increased production rates. More specifically, the present invention relates to an improvement in melt prilling of water sensitive materials, in particular, ammonium nitrate, urea, potassium nitrate and other water soluble melts which normally absorb water or go into solution readily at ambient conditions in their solid state.

11 Claims, 1 Drawing Sheet

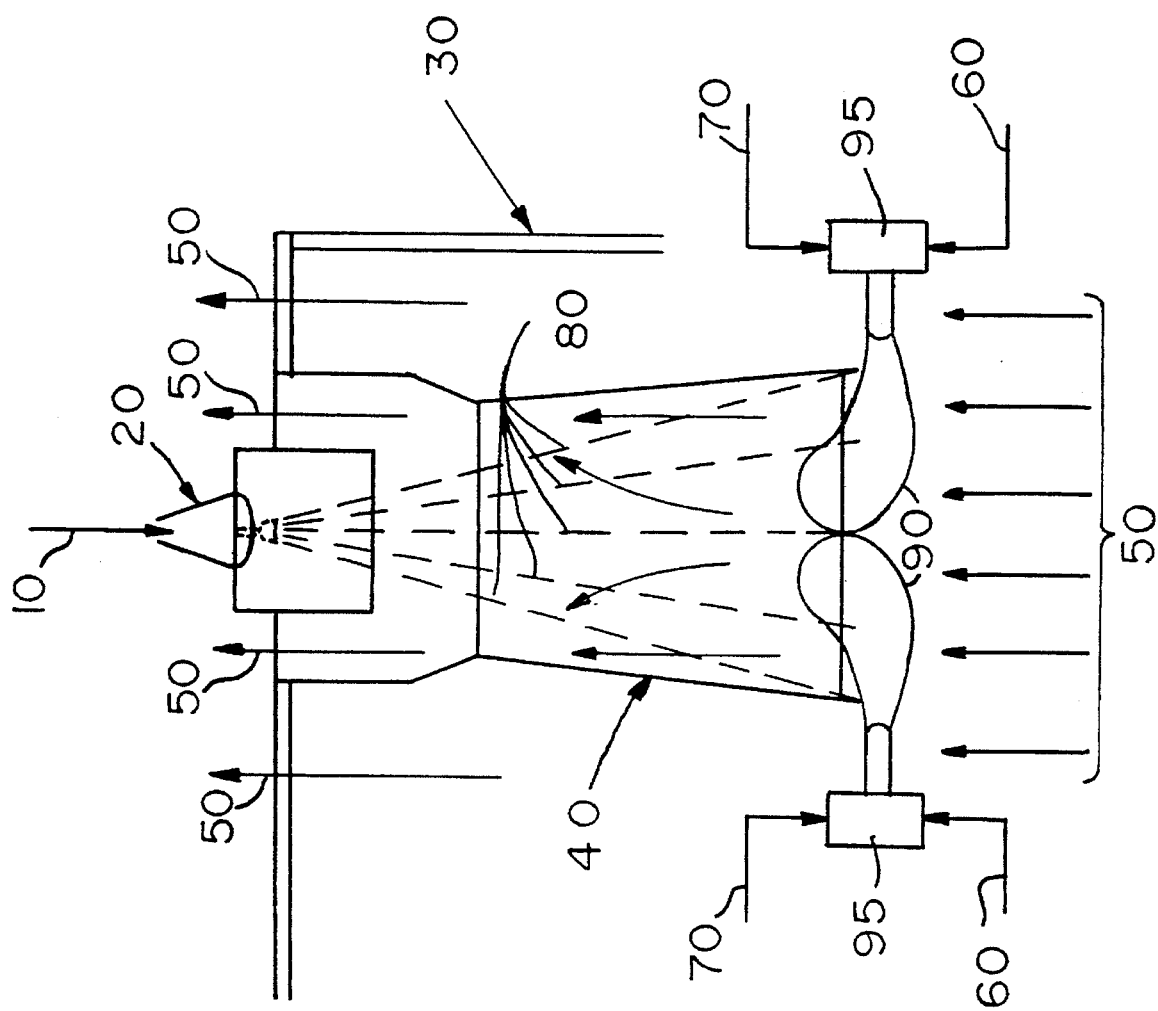

PROCESS FOR THE REDUCING EMISSIONS DURING PRILLING OF MATERIAL SUCH AS AMMONIUM NITRATE

This is a continuation of application Ser. No. 07/960,100, filed on Oct. 13, 1992, which was abandoned upon the filing hereof.

BACKGROUND OF THE INVENTION

This invention relates to an improvement in prilling whereby water is atomized into a prill tower to effect faster solidification of the prill, and in particular, the outside surface of the prill by providing an increased rate of surface cooling while reducing the required air flows in the tower. This results in a major reduction in air pollution potential in the form of both fume and particulate while at the same time allowing substantial production rate increases. Specifically, the invention relates to quick freezing the outside surface of the prill by flash evaporation of finely atomized water particles on the surface of the prill or in extremely close proximity to the prill to greatly lower the vapor pressure at the surface of the prill and by continued flash evaporation to enhance cooling so as to allow upward flowing air to be reduced to a point where micro-prills which are formed in prilling can settle in the prill tower while obtaining the same or increased production rates. More specifically, the present invention relates to an improvement in melt prilling of water sensitive materials, in particular, ammonium nitrate, urea, potassium nitrate and other water soluble melts which normally absorb water or go into solution readily at ambient conditions in their solid state.

Prilling is a form of granulation where a melt composed of one or several ingredients are formed into small drops and allowed to solidify as they fall by gravity through a gaseous medium which cools them to solidification.

In a prill tower, molten materials are formed into drops by a variety of ways including extruding through holes in concave, convex or flat drilled plates, spray nozzles, and spinning buckets with properly drilled holes. The preferred drilled plates are concave on the reservoir side with a convex surface on the extruded side. They can also be flat with holes drilled at an angle to radiate the streams of prill forming sprays. For purposes of this specification, all methods of prill forming or granulation shall be designated "extruding." As the droplets (prills) form, there are two types of potential air emissions which result.

1. During the formation of prills of the proper size, there are particulate micro-fine prills formed of almost an equal number. These particulate micro-prills are usually emitted out the top of the tower either directly to the atmosphere or into a pollution abatement device.

2. Prill formation creates a lot of surface area of solidifying melt, so the vapor pressure of that melt becomes very important. Vapors are given off from the melt at rates determined by laws of mass transfer. The vapors then form fumes which provide both a particulate and an opacity emission problem. The higher the temperature of the prill surface, and the longer it is at high temperatures, the greater the vapor pressure of the prill, and the more vapor which is given off, forming even more fumes.

Preferably, air flows upward through the prill tower, but there are down flow and cross flow towers also. The air provides an uplift to the prills causing them to settle in the tower at a slower rate than if they fell through quiescent air. This increases retention time in the tower and gives more time to solidify before reaching the bottom. At the same time, the air absorbs the heat from the falling prills.

In some cases, prilling is done into a liquid medium such as water as in the case of some sulfur prilling or in oil as in the case of some fertilizers. The water and/or oil provides the cooling medium. However, in the case of ammonium nitrate, which exemplifies one embodiment of this invention, and many other products such as urea, the prilling is done in air only. Ammonium nitrate and urea are both soluble in water, and ammonium nitrate and oil in combination are explosive.

The prills should be hard when they reach the bottom of the tower so that they will not deform or break. At the tower bottom, prills are collected by a number of methods such as: impinging on the bottom then removing with revolving scrapers; striking angled belting which funnels the prills onto a conveying means, usually a belt; and allowing the prills to fall into a fluid-bed which cools them further and conveys them out of the tower.

The air flowing past the falling prills removes heat and carries vapors from the prill surface. Since the air is extremely hot at the interface with the prill surface, but not away from the prill, small particles of submicron size are formed by recondensing and/or recombining vapors. Particles of this size are difficult to collect, and they present a highly visible and stable haze or fog which is very hard to remove from the exiting air. In the special case of ammonium nitrate, the fume is made up of a reaction of $NH_3$ and $HNO_3$ vapors which re-combine to form a blue haze consisting of ammonium nitrate particles of sub-micron size.

In the prior art, methods are known to avoid the emissions from prilling and the cost of subsequent clean-up operations of the air. Landis, in U.S. Pat. No. 4,190,622 used a combination of cocurrent and countercurrent flows to provide collection of emissions from a urea prill tower for subsequent removal from the air stream. Mahl et al. in U.S. Pat. No. 4,076,773, disclosed an internal recycle system whereby gases from the top of the tower were recycled to the bottom and ammonia was injected into the air to minimize the formation of ammonium nitrate fumes and allow cleanup. Others have disclosed various clean-up methods after the fumes and particulates have left the tower. The present invention reduces the need for accompanying clean-up devices and closed recycle towers and the expense of installing and operating them.

Also, heat transfer technology in Shirley et al., U.S. Pat. Nos. 4,213,924 and 4,424,176, both hereby incorporated by reference, in toto, describe water atomized in a rotary drum granulator to improve heat transfer from granules to air and improve granulation rates. In the latter, it was discovered that during cooling of solid particles such as in granulation, it was possible to get large increases in heat removal from the solid particles in the drum by controlled wetting of the particles just prior to forcing circulation air through a segment of the particles. The invention described herein takes that technology an order of magnitude further by actually atomizing water on a hot melt (still liquid) particle (prill) in such a manner that flash evaporation occurs before the water particles can be absorbed by the molten prill. The energy for evaporation of the water comes from the prill. For this to occur the melt must be sufficiently hot and the water particle sufficiently smaller than the melt particle such that the evaporation rate is extremely rapid, yet unlike that technology taught by others such as Haour et al. in U.S. Pat. 4,559,187 and Clark et al. in U.S. Pat. No. 4,339,401, the rapid cooling and water contact does not cause dissemination of the molten prill or particle. This process is also very different than a spray drag process such as described by Rauch et al. in U.S. Pat. No. 4,892,932 where water is sprayed in combination with the substance to be solidified or a prilling of water containing melt where water must migrate out of the granule, a process which cannot occur in a large prill in a short period of time such as is available in a prill tower.

SUMMARY OF THE INVENTION

This invention atomizes water into the air to enhance the rate of cooling and solidification, especially of the outside surface of the prill, the source of the fume. In the prior art, the use of water has always been considered impossible in prill towers with ammonium nitrate and urea since they are soluble in water and very hygroscopic materials, however, that hygroscopicity is very dependent on the temperature of the prills. It has been found that even if the atomized water strikes the ammonium nitrate the smaller water particle flash evaporates, thus lowering the surface temperature of the prill. This is because the prill is sufficiently large and hot when compared to the water particles to give it the energy to completely evaporate. An extremely thin air film next to the prill is essentially the temperature of the prill, and thus, very low in relative humidity and available to contain the newly created water vapor. The temperature of the prill must never be allowed to fall below the point where the humidity in the air in contact with the prill has a water vapor pressure above that which exists in a saturated solution of the chemical at the prill temperature. The point of equal vapor pressures is called the point of critical humidity. If humidity conditions at the prill surface exceed the critical humidity, or the atomized water particle is sufficiently large with respect to the prill size and energy, the prill will absorb water, and this process will not work.

It is further pointed out that the atomized water particles are so small they are a true aerosol and any un-evaporated particles are suspended and carried by the air until they either impinge on a prill, leave the tower with the discharge of tower air, or evaporate into the tower air, thus beneficially lowering its temperature while inside the tower.

One embodiment of this invention is now in operation, incorporated in a commercial ammonium nitrate prilling tower. The invention was mainly installed as a part of a pollution control system with extremely impressive results, but has also increased production rates from the tower by 20% while lowering prill discharge temperatures significantly, thus enhancing the capacity of downstream coolers by reducing their cooling load per ton of throughput.

More specifically this invention is a method to enhance the rate of cooling and solidification and/or suppress fume formation in a prilling operation comprising:

a) extruding a material into a flow of air, thereby creating prills of that material, b) creating a mist of very fine water particles in the flow of air, c) moving the prills into contact with the mist and then separating the prills from the flow of air, so that the rate of cooling and solidification of said prills is enhanced and fume and particulate formation in the flow of air is suppressed or the production rate of said prills is increased or both.

Preferably the material is a melt which is extruded into the top of an upward flow of air, and the mist is created below the extrusion of the melt. Generally, the prills are about 0.2 to 4 mm in diameter. Preferably the prills have a diameter in the range from about 0.2 to about 4 mm. Most preferred is a diameter of 1 to 2.5 mm. Generally the mist has water particle of 5 to 150 microns in size, which is a median volume diameter (MVD) measurement. Preferably the mist contains water particles having a diameter in the range of about 5 to about 75 microns. Most preferred is 5 to 60 microns (MVD). The ratio of the diameter of prills to the very fine water particles MVD (MVD is Median Volume Diameter) should range as follows:

| General | 12–160 |
| Preferred | 20–120 |
| Most preferred | 30–100. |

The preferred method is most useful where the prills are water sensitive, such as prills of material selected from the group consisting of urea, ammonium nitrate and potassium nitrate, more preferably ammonium nitrate. This invention is also to the product formed by the process described above.

BRIEF DESCRIPTION OF THE DRAWINGS

The FIGURE is a schematic showing a typical embodiment of this invention.

DETAILED DESCRIPTION

The FIGURE shows an exemplary embodiment of the invention.

Prills are formed in a prill tower 30 as multiple small streams 80 of melt radiates from the forming (extruding) device, such as prilling head 20, extruding melt 10. As they radiate, the streams 80 break-up into droplets (prills) forming spheres due to surface tension. As the normal prills form, micro-spheres are also formed occurring between the larger prills. The very fine particulate micro-prills are so small that as a rule do not settle well against the up-flowing air currents 50. All of the prills are initially in a molten condition. Vapors are evolved from the prills according to the melt temperature and especially that of the prill surface. In order to suppress the fumes, the melt particles are sprayed with a fog or mist 90 of highly atomized water 60 having a preferred size range given above. The fog or mist 90 is formed by atomizer 95 which can be hydraulic or use compressed air 70. A combination of water mist 90 evaporating on the surface or near the surface of the prills rapidly freezes a film on the granules and/or cools their outside surface so rapidly as to quickly reduce or eliminate any sizable vapor emissions from the prills. Thus, in the case of ammonium nitrate, since $NH_3$ and $HNO_3$ vapor pressures are quickly reduced, the reformation of the vapors into sub-micron particles of $NH_4NO_3$ are greatly reduced. It is best to contain the forming particles in a shroud 40 until they can be contacted with the water mist 90 since the concentration of water mist 90 can be maintained at a high level without more extensive water evaporation. However, this is more difficult to do with some methods of prill formation such as in the use of spinning buckets than with spray heads or perforated plates. Those skilled in the art will recognize that shrouds can be easily designed to accommodate most prill formation means and that indeed the invention does not require a shroud, but that they only help guide the intense fog of water mist 90 and granules together, and further, that a great intensity of the fog or mist 90 made up of very small particles is best, but that any spray of reasonable small size water droplet is helpful as long as evaporation from the particle is complete to the extent that product and/or production problems are not caused later even including some assimilation of the water into the prills. With the suppression of vapor pressure of the prills, the opacity problems are greatly reduced, however, micro-prills would still be a problem except for the ability to reduce up-flowing and/or side flowing air 50 to the point where most of the micro-prill volume is effected. Since most of the particulate emissions from the top of a prill tower 30 are caused by the air conveyance of the larger micro-prills out the tower, that air conveyance can be substantially reduced by reducing the air flows 50 in the prill tower 30; typically water fogging (mist 90) allows air flows 50 to be reduced by up to 50%, thus, reducing the size of micro-prill carried out of the tower according to the laws of particle dynamics by approximately 75% and the actual emission by 90 to 99%. With a reduction in air flow, which allow micro-prills to settle which would otherwise be blown out of the tower, the normal size prill also settle faster, and thus, their retention time in air 50 is less. The improved overall volumetric heat transfer coefficient of the tower resulting from the spraying of water mist 90 allows prills to cool faster even to the point where prill tower capacity increases can be accomplished, by atomizing water mist 90, not only near the formation point of the prills, but also throughout the tower, including near the bottom. The water can be atomized to mist 90 by any method and combination of methods which produces sufficiently small particles, such as, but not limited to, mechanical, hydraulic, pneumatic, impingement or sonic. It is preferred to use both hydraulic and pneumatic singularly and in combination with each other.

EXAMPLES

A better understanding of the present invention and of its many advantages will be had by referring to the following specific examples given by way of illustration.

Example I (Comparative)

The commercial prill tower which has been described earlier was tested according to the sampling procedures set forth in the Appendix to the Code of Federal Regulations, Title 40, Chapter I, Part 60, Methods 1, 2, 3, and 5 Modified. The tower at the time of this test was not equipped with water atomization means. Production rates were 12.5 tons/hr of fertilizer grade ammonium nitrate, with a moisture content of 0.2 % and average particle size of 2.1 mm. Air flow rates provided by the tower fans were 62,000 ACFM with micro-prill emissions at 14.25 lb/hr. Opacity from the prill tower was at 10%. Fumes emitted from shrouded portion of tower after passing through a scrubber and mist eliminator gave an opacity of 50–80%.

Example II

Thirty-two water atomization nozzles were installed, 16 hydraulic and 16 pneumatic, and all operating as described above. The prill tower was sampled as described in Example I. Production rates were 12.5 ton/hr. The water atomization rate of 2.63 gpm allowed air flow rates for the tower fans to be reduced to 43,000 ACFM. Water atomization was both by hydraulic and pneumatic apparatus such that spray particles ranged in size from 25 micron MVD to 50 micron MVD. Prills had an average particle size of 2.1 mm such that the average diameter ratio of prills to water particles was about 71. The air flow rate in the shroud provided a density of spray particles to air of about $1.6 \times 10^8$ particles per $ft^3$ and a density of prills to air within the shroud of 440 particles per $ft^3$. The resulting micro-prill emissions were 1.7 lb/hr and opacity from the prill tower was undetectable. Fumes emitted from the shrouded portion of the tower, when run as in Example I, were reduced to an opacity of 20–30%.

Example III

Additional water atomizing nozzles were installed just above the mats at the bottom of the tower. When the entire system is activated, overall rate increases of 20% are experienced when ambient air temperatures are 85° F. with a drop of fifteen degrees F. in the resulting prill temperature at the bottom of the tower to assist the cooling capacity of the rotary coolers. The prilled product shows no change of moisture concentration whether or not the atomized water sprays are activated.

While the invention has been described in connection with what is presently considered to be the most practical and preferred embodiments, the invention is not limited to the disclosed embodiment but, on the contrary, is intended to cover various modifications and equivalents included within the spirit and scope of the following claims.

What is claimed is:

1. A method for producing prills with suppression of fume formation comprising:

a) extruding a material into a flow of air, thereby creating prills of said material, b) creating a mist of very fine water particles in said flow of air, c) moving said prills into contact with said mist, and d) separating said prills from said flow of air, and wherein said water particles have a diameter in the range of about 25 to 50 microns MVD.

2. The method of claim 1 wherein said material is extruded into the top of an upward flow of air.

3. The method of claim 1 wherein said material is molten.

4. The method of claim 2 wherein said mist is created below said extrusion of step a).

5. The method of claim 1 wherein said prills have a diameter in the range of from about 0.2 mm to about 4 mm.

6. The method of claim 5 which the range is from about 0.5 mm to about 3 mm.

7. The method of claim 5 wherein the ratio of the diameter of the prill to the very fine water particles is from about 12 to about 160.

8. The method of claim 7 wherein the ratio is from about 20 to about 120.

9. The method of claim 1 wherein the prills are water sensitive.

10. The method of claim 9 wherein the prills are a material selected from the group consisting of urea, ammonium nitrate and potassium nitrate.

11. The method of claim 1 wherein the prills are ammonium nitrate.

\* \* \* \* \*